(12) United States Patent
Kawahara et al.

(10) Patent No.: US 7,944,831 B2
(45) Date of Patent: May 17, 2011

(54) DATA COMMUNICATION NETWORK HAVING MULTIDIMENSIONAL LINK STRUCTURE

(75) Inventors: Masato Kawahara, Tokyo (JP); Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1102 days.

(21) Appl. No.: 11/637,048

(22) Filed: Dec. 12, 2006

(65) Prior Publication Data

US 2007/0133410 A1    Jun. 14, 2007

(30) Foreign Application Priority Data

Dec. 13, 2005   (JP) ................................. 2005-359148

(51) Int. Cl.
*G01R 31/08*   (2006.01)
(52) U.S. Cl. .......................... 370/231; 370/235; 370/254
(58) Field of Classification Search .................. 370/231, 370/235, 254
See application file for complete search history.

(56) References Cited

U.S. PATENT DOCUMENTS

| | | | | |
|---|---|---|---|---|
| 5,987,468 A * | 11/1999 | Singh et al. | .................... | 707/100 |
| 6,671,737 B1 * | 12/2003 | Snowdon et al. | ............. | 709/243 |
| 6,853,620 B2 * | 2/2005 | Mauritz et al. | ................ | 370/237 |
| 7,383,252 B2 * | 6/2008 | Soogoor | ........................... | 707/3 |
| 2004/0193729 A1 * | 9/2004 | Saraph | .......................... | 709/241 |
| 2005/0060395 A1 * | 3/2005 | Korotky | ....................... | 709/223 |

OTHER PUBLICATIONS

"Research and Development of Optical Access Network High Speed Wide Area Communication Technology Relating to Photonic Networks", 2004 NICT Contract Research and Development report, National Institute of Information and Communications Technology, May 2005, pp. 280-308 and pp. 513 to 522.

* cited by examiner

*Primary Examiner* — Huy D Vu
*Assistant Examiner* — Kibrom T Hailu
(74) *Attorney, Agent, or Firm* — Rabin & Berdo, P.C.

(57) ABSTRACT

The present invention provides a data communication network that has a link structure that allows a large traffic-handling performance to be obtained with a small network construction cost. In the data communication network of the present invention, the nodes are assigned with m-dimensional coordinates (J1, J2, J3, J4, J5, . . . , Jm−1, Jm), in which any one of the coordinate values J1 to Jm is zero and the other coordinate values are all natural numbers, and each of said node is connected to other nodes which satisfy both of the following conditions (i) and (ii): (i) the coordinate Jp whose value is zero at said other node differs from a coordinate Jq whose value is zero at said node; and (ii) the value of coordinates other than the Jp and the Jq at said the other node all match the corresponding coordinate values of said node.

11 Claims, 17 Drawing Sheets

GroupG1

GroupG3

GroupG4

GroupG2

DATA COMMUNICATION NETWORK HAVING MULTIDIMENSIONAL LINK STRUCTURE

BACKGROUND OF THE INVENTION

1. Field of the Invention

The present invention relates to a multidimensional link structure of a data communication network. The present invention can be applied to all data communication networks including a public communication network such as the Internet, an Inter-corporate network such as a WAN or Extranet, a Local Area Network, a computer network, a distributed computer network, a distributed router network, an Exchange Network, a Switch Network that is constructed in a router or an electronic device, a network that is constructed in a circuit substrate for a connection between a Central Processing Unit (CPU) and a memory, and a network that is constructed in an Integrated circuit.

2. Description of Related Art

A data communication network is capable of connecting a plurality of nodes. Using a data communication network allows the processing of a plurality of nodes to be distributed and the processing efficiency to be improved.

Known link structures for a data communication network are, for example, the bus structure, ring structure, the hub structure (that is, the star structure), and the full mesh structure. These link structures can be expanded in two dimensions, three dimensions or a greater number of dimensions. A link structure that has been made multidimensional is known as a hyperlink structure.

In order to cope with the increase in the traffic of data communication networks, the maximum value of the traffic that the data communication network is capable of processing, that is, the traffic-handling performance must be increased. As a method for increasing the traffic-handling performance, an increase in the number of nodes contained in the data communication network, an increase in the total number of links contained in the data communication network, and the adoption of a link structure having a high traffic-handling performance may be considered. On the one hand, an increase in the traffic-handling performance is desirably implemented at minimum cost. In order to keep costs low, the traffic-handling performance must be efficiently increased using a number of nodes and a total link number that are as small as possible. 2004 NICT Contract Research and Development report 'Research and Development of Optical access network high speed wide area communication technology relating to photonic networks', National Institute of Information and Communications Technology, May 2005, pages 280 to 308 and pages 513 to 522 is known, for example, as a document that discloses the relationship between the number of nodes, total link number and link structure and the traffic-handling performance.

FIG. 1 is a graph that shows the relationship between the number of nodes and the traffic-handling performance. In FIG. 1, the vertical axis is the number of nodes contained in the data communication network and the horizontal axis is the traffic-handling performance of the whole data communication network. The traffic-handling performance is given by the product of the processing performance for each single node and the number of nodes. In FIG. 1, the reference number assigned to each curve indicates the type of link structure and the hyper degree. B is a bus structure, R is a link structure, H is a hub structure, and F is a full mesh structure. For example, B1 is a one-dimensional bus network and R2 is a two-dimensional ring network.

In FIG. 1, link structures with smaller inclinations are able to obtain a high traffic-handling performance with a small number of nodes and therefore high traffic efficiency. For example, a one-dimensional full mesh structure F1 and two-dimensional hub structure have a very high traffic efficiency and a one-dimensional bus structure and a one-dimensional ring structure have a very low traffic efficiency.

FIG. 2 is a graph that shows the relationship between the total number of links and the traffic-handling performance. In FIG. 2, the vertical axis is the total number of links contained in the data communication network and the horizontal axis is the traffic-handling performance of the whole data communication network. The significance of the traffic-handling performance and the significance of the reference numbers assigned to each curve are the same as those of FIG. 1.

In FIG. 2, link structures with smaller inclinations are able to obtain a high traffic-handling performance with a small number of nodes and therefore high traffic efficiency. For example, a four-dimensional hub structure H4 has very high traffic efficiency and a one-dimensional bus structure B1 and a one-dimensional ring structure R1 has very high traffic efficiency.

As can be seen from FIGS. 1 and 2, in general, link structures for which the ratio 'traffic'/'number of nodes' is high have a low 'traffic'/'total node number' ratio and link structures for which the ratio 'traffic'/'total number of links' is high have a low 'traffic'/'number of nodes' ratio. In other words, link structures for which both the 'traffic'/'number of nodes' ratio and the 'traffic'/'total number of links' ratio are optimal do not exist.

FIG. 3A is a graph showing the relationship between the traffic-handling performance and the cost performance. FIG. 3B is a partial enlargement of FIG. 3A. In FIGS. 3A and 3B, the vertical axis is the cost performance of the network configuration, that is, the ratio TNC/T between the total network cost TNC and the traffic-handling performance T. The horizontal axis is the traffic-handling performance T, the units of which are terabits per second. The significance of the traffic-handling performance and the significance of the reference numbers assigned to each curve are the same as those in FIG. 1. For example, in the case of a four-dimensional hub structure H4, the network construction costs when TNC/T=23 and T=1000 are 2.3 trillion Japanese yen.

As can be seen from FIGS. 3A and 3B, the link structure and hyper degree for the optimal cost and performance vary depending on the required traffic-handling performance T.

SUMMARY OF THE INVENTION

An object of the present invention is to provide a data communication network that has a link structure that makes it possible to obtain a large traffic-handling performance at a small network construction cost.

In a data communication network according to the present invention, a plurality of nodes are arranged, each of the nodes is assigned with m-dimensional coordinates (J1, J2, J3, J4, J5, ..., Jm−1, Jm), in which any one of the coordinate values J1 to Jm is zero and the other coordinate values are all natural numbers, each of the nodes is connected to other nodes which satisfy both of the following conditions (i) and (ii): (i) the coordinate Jp whose value is zero at said other node differs from a coordinate Jq whose value is zero at said node; and (ii) the value of coordinates other than the Jp and the Jq at said the other node all match the corresponding coordinate values of said node.

BRIEF DESCRIPTION OF THE DRAWINGS

Further objects and advantages of the present invention will now be described with reference to the attached drawings below.

DESCRIPTION OF THE PREFERRED EMBODIMENTS

Figure 1:
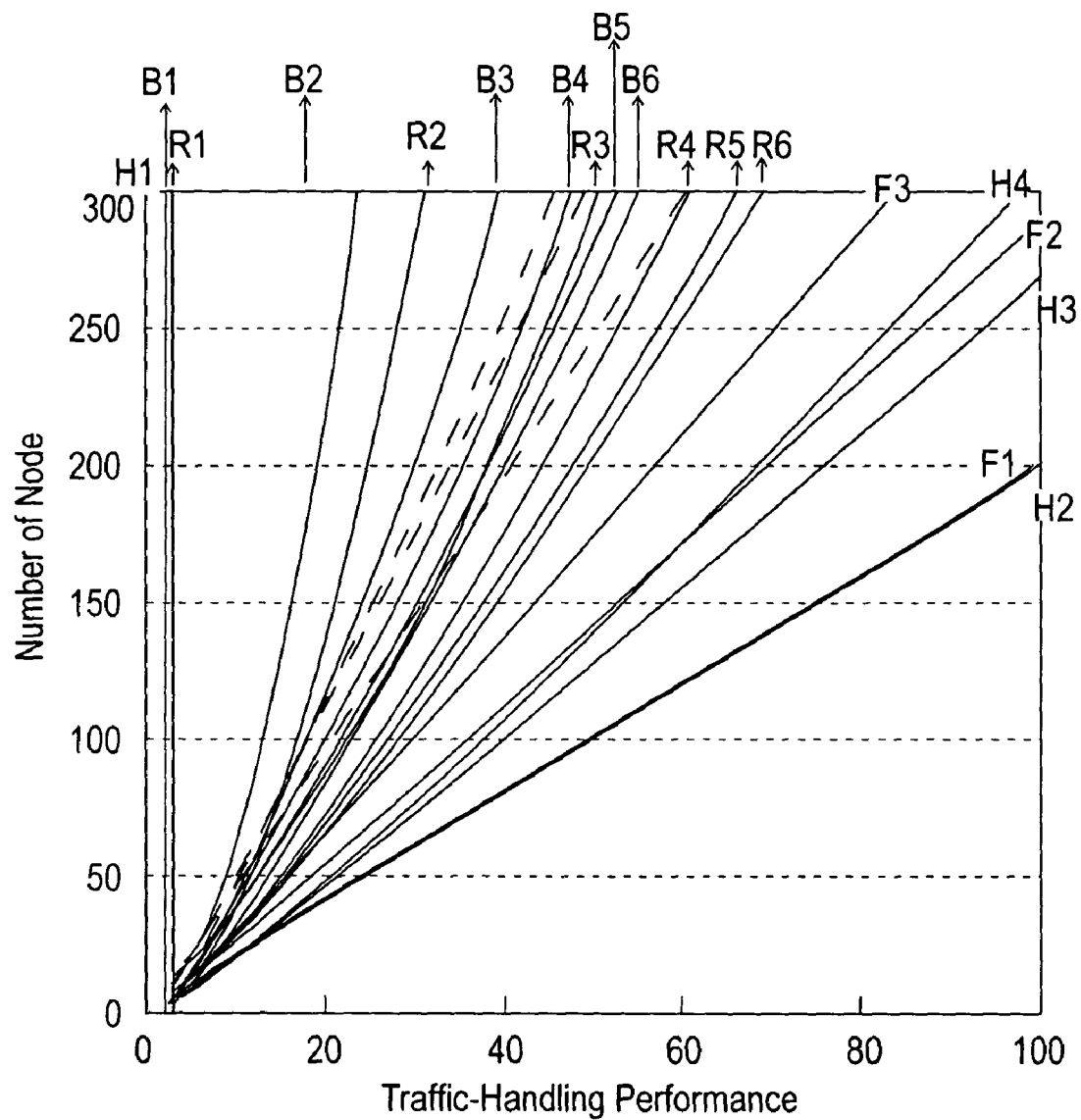
FIG. 1 is a graph that shows the relationship between the number of nodes and the traffic-handling performance.
Figure 2:
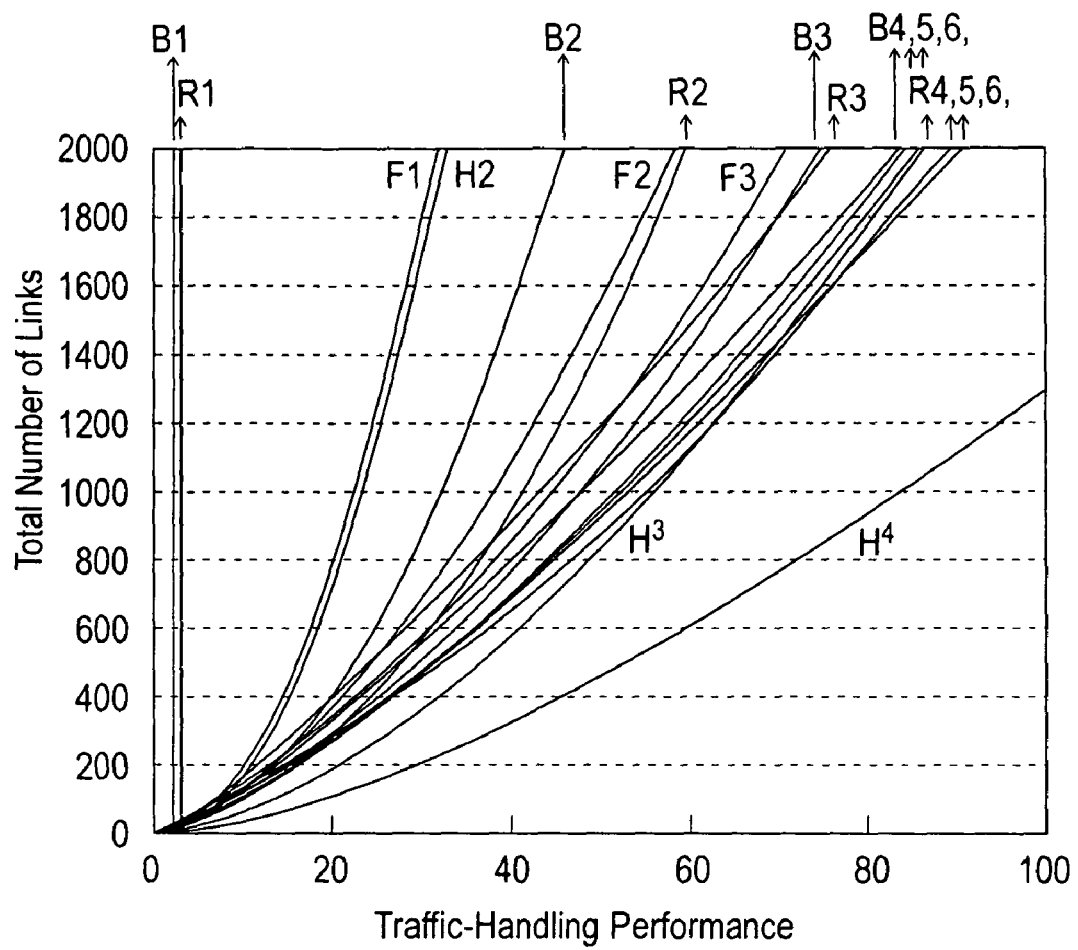
FIG. 2 is a graph that shows the relationship between the total number of links and the traffic-handling performance.

An embodiment of the present invention will be described hereinbelow with reference to the drawings. The size, shape, and dispositional relationship of the constituent elements in the drawings are only shown schematically to an extent permitting an understanding of the present invention. Further, the numerical conditions illustrated hereinbelow merely serve as an illustration.

[1] Link Structure

The link structure of the data communication network according to this embodiment will now be described. In the following description, the link structure of the present invention is designated as an interchange structure. An interchange structure can adopt three-dimensions, four dimensions, or a greater number of dimensions. An interchange structure is a technology based on a 'hyperhub structure' which is a link structure devised by the present inventor. Hence, the hyperhub structure will first be described, followed by the interchange structure according to this embodiment.

The hyperhub structure of this embodiment can be applied to a connection between an edge node and a core node, for example. The interchange structure of this embodiment can be applied to connections between core nodes, for example.

(1-1) m-Dimensional Hyperhub Structure

A description will be described hereinbelow by adopting a case where an m-dimensional hyperhub structure is applied to a connection between an edge node and a core node.

An edge node is a node for connecting a data communication network to an external network. A core node is a node only for performing communication within the data communication network. Hence, the edge node is connected to one or more core nodes within the data communication network while also being connected to an edge node of an external network. The core node is connected only to the edge node and another core node in the data communication network.

In the m-dimensional hyperhub structure of the present inventor, m-dimensional coordinates are assigned to the core node and edge node respectively.

The edge node coordinates are defined as $(a_1, a_2, \ldots, a_m)$. The respective coordinates $a_1$ to $a_m$ are natural numbers equal to or more than 1. The maximum values of the respective coordinate values are defined as $n_1, n_2, \ldots, n_m$. The total number $N^*$ of edge nodes is $n_1 \times n_2 \times \ldots \times n_m$, that is, $\Pi n_i$ ($i=1, 2, \ldots m$).

The core node coordinates are defined as $(b_1, b_2, \ldots, b_m)$. Any one of $b_1$ to $b_m$ is zero while the others are all natural numbers. The maximum values of the respective coordinate values are $n_1, n_2, \ldots, n_m$. The number of core nodes is $N^*/n_1 + N^*/n_2 + \ldots + N^*/n_m$, that is, $N^* \times \Sigma(1/n_i)$ ($i=1, 2, \ldots, m$).

The connective relationship between the edge nodes and the core nodes is defined as follows.

As mentioned earlier, any one of the core node coordinate values $b_1$ to $b_m$ is zero while the others are non-zero values. With the m-dimensional hyperhub structure, only when the core node coordinates and the edge node coordinates are compared and the non-zero coordinate values all match are the edge node and core node connected. For example, a core node the coordinate value $b_1$ of which is zero $(0, b_2, \ldots, b_m)$ is connected only to edge nodes for which $a_2=b_2$, $a_3=b_3, \ldots, a_m=b_m$ are established. In other words, the core node $(0, b_2, \ldots, b_m)$ is connected to the edge nodes $(1, b_2, \ldots, b_m), (2, b_2, \ldots, b_m), \ldots, (n_1, b_2, \ldots, b_m)$. The method of determining the connection destinations for the other core nodes is the same as that used for core node $(0, b_2, \ldots, b_m)$.

The m-dimensional hyperhub structure is technology that is based on the subsequently described m-dimensional interchange structure. This means that the subsequently described m-dimensional interchange structure can also be called an auxiliary hyperhub structure.

(1-2) Three-Dimensional Interchange Structure

The interchange structure of this embodiment will be described by taking a three-dimensional link structure by way of example.

When a three-dimensional link structure is constructed, the plurality of nodes contained in the data communication network are divided into the three groups G1, G2, and G3.

In this description, the respective nodes are expressed using coordinates $(x, y, z)$. Any one of $x, y, z$ is zero while the others are natural numbers. The coordinates of the nodes belonging to group G1 are expressed as $(0, y, z)$. The coordinates of the nodes belonging to group G2 are expressed as $(x, 0, z)$. The coordinates of the nodes belonging to group G3 are expressed as $(x, y, 0)$.

Figure 4:
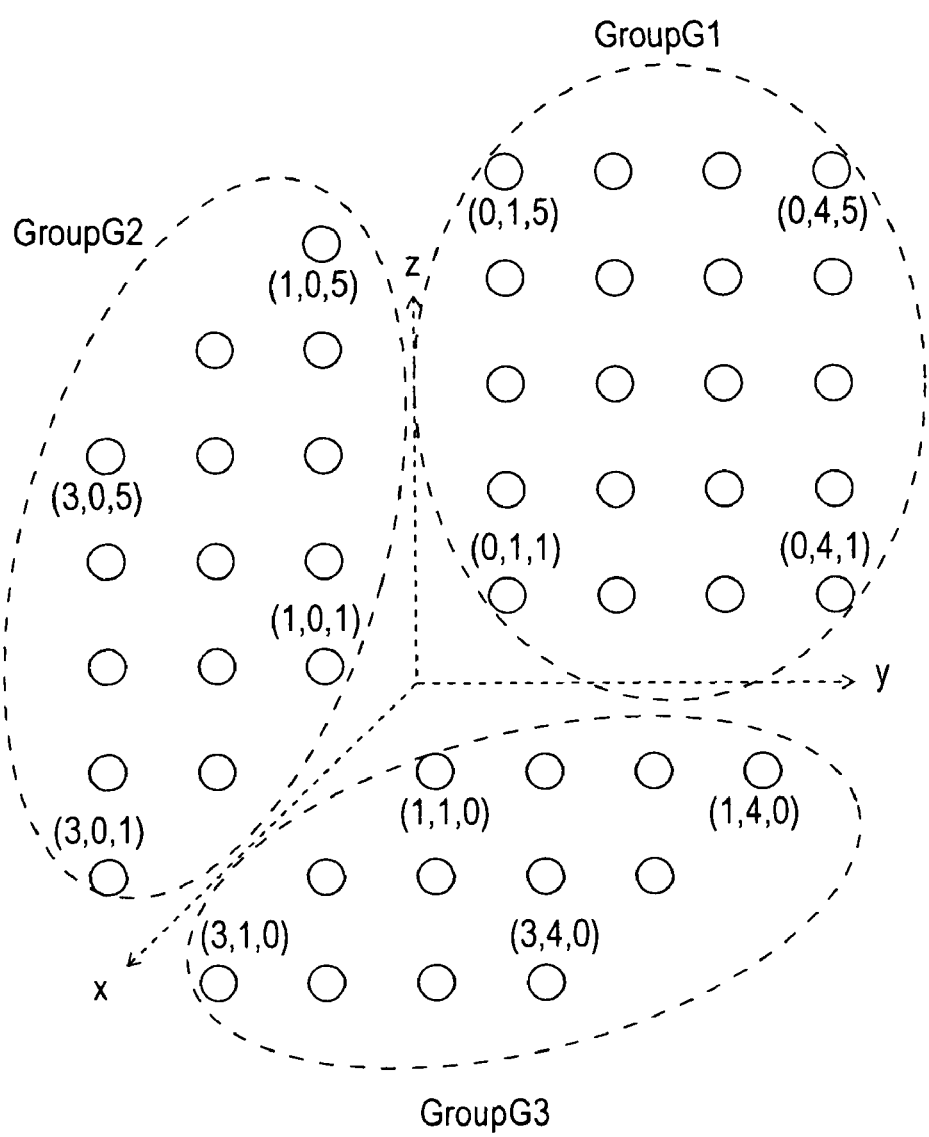
FIGS. 4 to 9 are conceptual views serving to illustrate a three-dimensional interchange structure according to an embodiment of the present invention.

FIG. 4 is a conceptual view of the coordinates of nodes that belong to groups G1, G2, and G3. FIG. 4 does not show the actual positional relationships between the nodes. The coordinates $(x, y, z)$ can be suitably assigned by the designer or the like of the data communication network. In the example in FIG. 4, twenty nodes belong to group G1, fifteen nodes belong to group G2, and twelve nodes belong to node G3. However, the number of nodes belonging to each group is not limited. As is clear from FIG. 4, the nodes that belong to group G1 all have an x coordinate value of zero and are therefore specified by the y and z coordinate values. Likewise, the nodes belonging to group G2 are specified by x and z coordinate values and the nodes that belong to group G3 are specified by the x and y coordinate values.

The respective nodes are not directly connected to other nodes belonging to the same group but rather are connected to nodes among the nodes belonging to the other groups that satisfy predetermined conditions.

Figure 5:
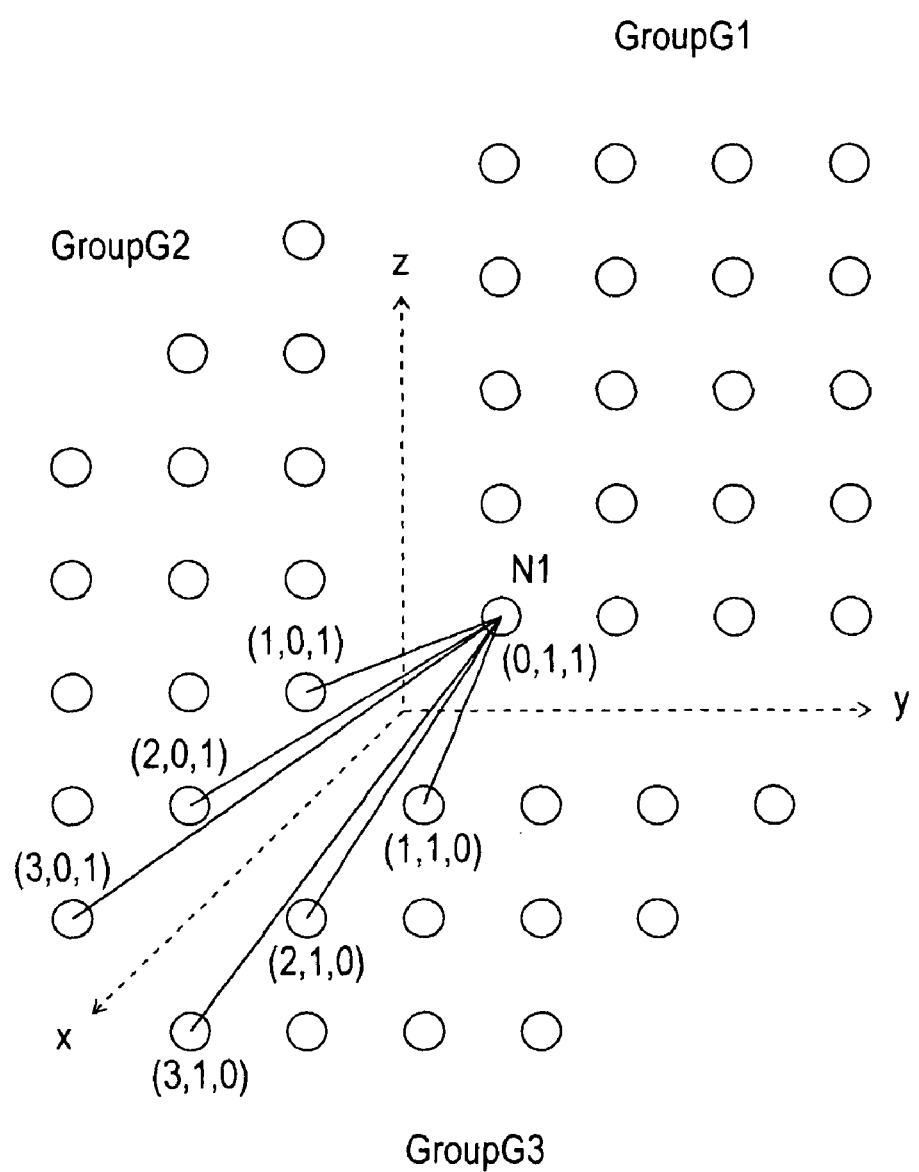

The connection destinations of the nodes belonging to group G1 will now be described by using FIG. 5. In the following description, one specified node N1 $(0, b, c)$ will be described by way of example among the nodes that belong to group G1. b and c are non-zero values. In the example of FIG. 5, the coordinates of the specified N1 are (0, 1, 1).

As mentioned earlier, the nodes belonging to group G1 are not connected to other nodes that belong to group G1. Node N1 is connected to nodes that satisfy the following conditions among the nodes belonging to groups G2 and G3.

The nodes that are connected to the specified node N1 among the nodes that belong to group G2 for which the coordinate value y=0 are nodes whose coordinates satisfy the following conditions:

x=1, 2, 3, . . .
by definition, y=0
z=c

In other words, nodes among the nodes belonging to group G2 for which the coordinate value z matches specified node N1 are all connected to node N1. In the example in FIG. 5, specified node N1 is connected to all the nodes for which the coordinate value z is '1', that is, to nodes (1, 0, 1), (2, 0, 1), and (3, 0, 1) among the nodes belonging to group G2.

Nodes among the nodes belonging to group G3, that is, the nodes for which z=0 are connected to specified node N1 are nodes whose coordinates satisfy the following conditions:

x=1, 2, 3, . . .
y=b
by definition, z=0

In other words, nodes among the nodes belonging to group G3 for which the coordinate value y matches specified node N1 are all connected to specified node N1. In the example in FIG. 5, the specified node N1 is connected to all the nodes among the nodes belonging to group G3 for which the coordinate value y is '1', that is to nodes (1, 1, 0), (2, 1, 0), and (3, 1, 0).

The connection destinations of the other nodes belonging to group G1 are determined using the same method as the case of specified node N1. As a result, each node belonging to group G1 is connected to all the nodes for which either of the coordinate values y and z is zero and the other matches its own coordinate value.

Figure 6:
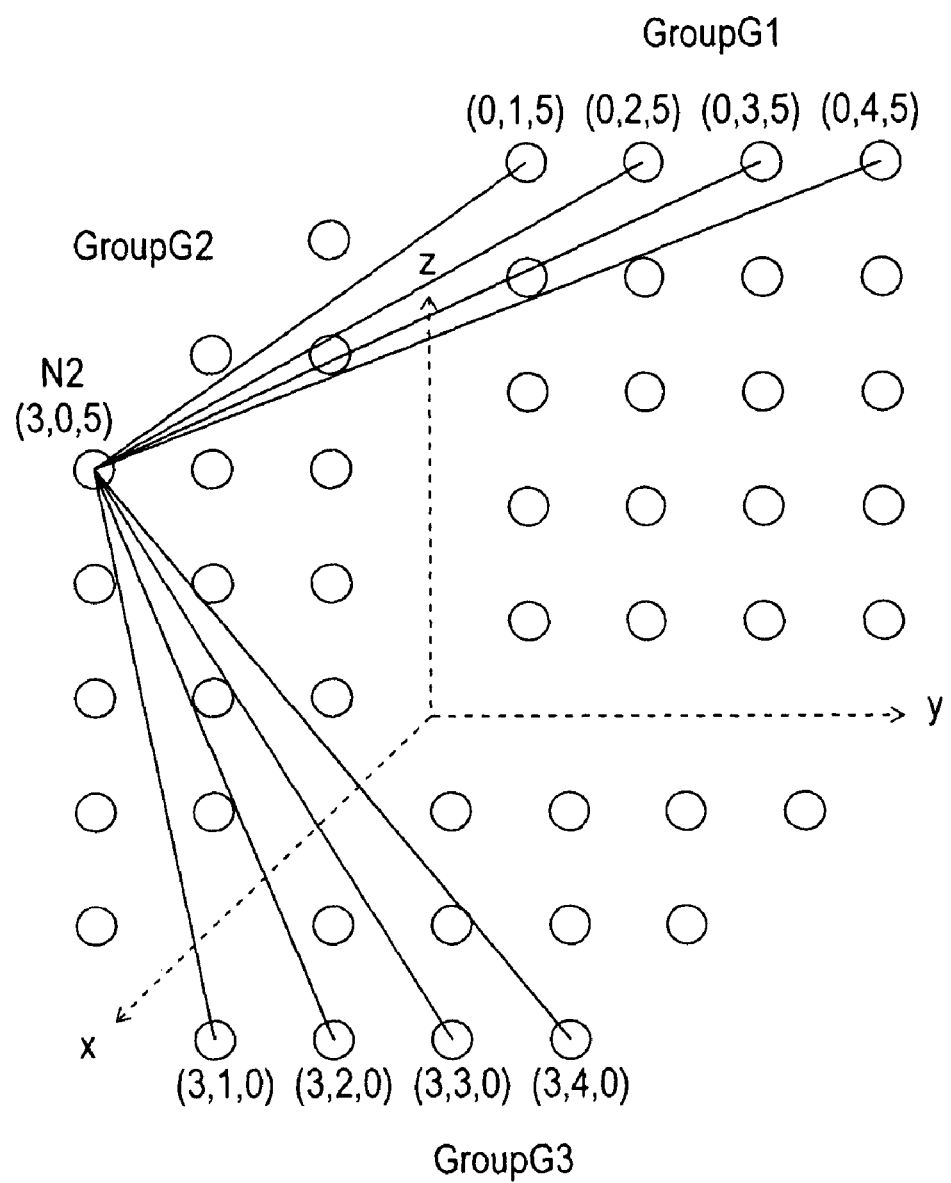

The connection destination of the nodes belonging to group G2 will be described next using FIG. 6. In the following description, an example where there is one specified node N2 (a, 0, c) among the nodes belonging to group G2 is provided. a and c are non-zero values. In the example of FIG. 6, the coordinates of specified node N2 are (3, 0, 5).

The nodes belonging to group G2 are not connected to the other nodes belonging to group G2. Node N2 is connected to the nodes among the nodes belonging to group G1 or group G3 that satisfy the following conditions.

The nodes among the nodes belonging to group G1, that is, for which x=0 which are connected to specified node N2 are nodes the coordinates of which satisfy the following conditions:

By definition, x=0
y=1, 2, 3, . . .
z=c

In other words, nodes among the nodes belonging to group G1 for which the coordinate value z matches that of the specified node N2 are all connected to specified node N2. In the example of FIG. 6, specified node N2 is connected to all the nodes belonging to group G1 for which the coordinate value z is '5', that is, to nodes (0, 1, 5), (0, 2, 5), (0, 3, 5), and (0, 4, 5).

Among the nodes that belong to group G3, that is, for which z=0, the nodes that are connected to specified node N2 are nodes whose coordinates satisfy the following conditions:

x=a
y=1, 2, 3, . . .
By definition, z=0

In other words, the nodes that belong to group G3 for which coordinate x matches that of specified node N2 are all connected to specified node N2. In the example of FIG. 6, specified node N2 is connected to those nodes among the nodes belonging to group G3 for which coordinate value x is '3', that is, to nodes (3, 1, 0), (3, 2, 0), (3, 3, 0), and (3, 4, 0).

Figure 7:
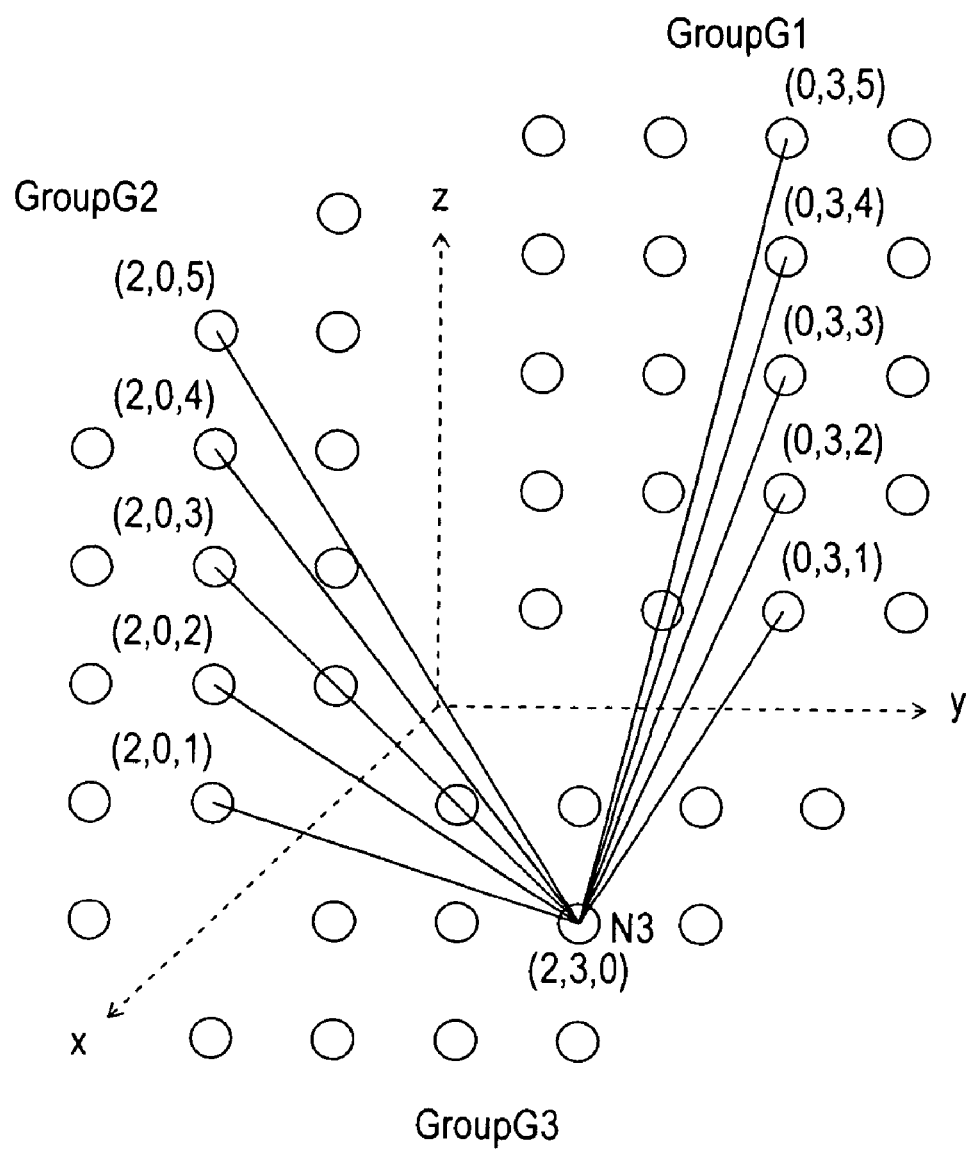

The connection destinations of the nodes belonging to group G3 will be described next using FIG. 7. The following description is provided by taking one specified node N3 (a, b, 0) among the nodes belonging to group G3 by way of example. a and b are non-zero values. In the example of FIG. 7, the coordinates of specified node N3 are (2, 3, 0).

The nodes belonging to group G3 are not connected to the other nodes belonging to group G3. Node N3 is connected to the nodes among the nodes belonging to group G1 or group G2 that satisfy the following conditions.

Among the nodes belonging to group G1, that is, for which x=0, the nodes that are connected to specified node N3 are nodes whose coordinates satisfy the following conditions:

By definition, x=0
y=b
z=1, 2, 3, . . .

In other words, among the nodes that belong to group G1, the nodes for which the coordinate value y matches that of the specified node N3 are all connected to specified node N3. In the example of FIG. 7, the specified node N3 is connected to all the nodes among the nodes belonging to group G1 for which coordinate value y is '3', that is, nodes (0, 3, 1), (0, 3, 2), (0, 3, 3), (0, 3, 4), and (0, 3, 5).

Among the nodes belonging to group G2, that is, for which y=0, the nodes which are connected to specified node N3 are nodes whose coordinates satisfy the following conditions.

x=a
by definition, y=0
z=1, 2, 3, . . .

In other words, among the nodes belonging to group G2, the nodes for which the coordinate value x matches the specified node N3 are all connected to specified node N3. In the example of FIG. 7, specified node N3 is connected to nodes among the nodes belonging to group G2 for which coordinate value x is '2', that is, to nodes (2, 0, 1), (2, 0, 2), (2, 0, 3), (2, 0, 4), and (2, 0, 5).

Figure 8:
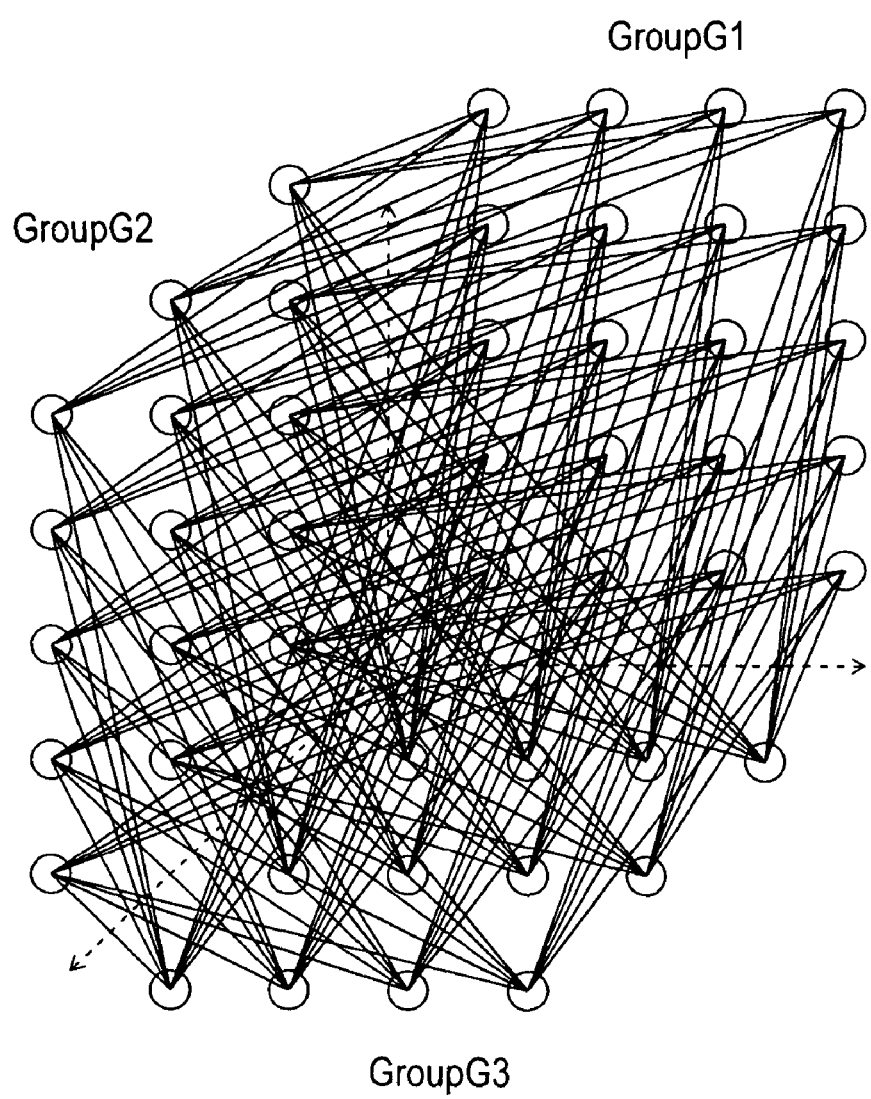
Figure 9:
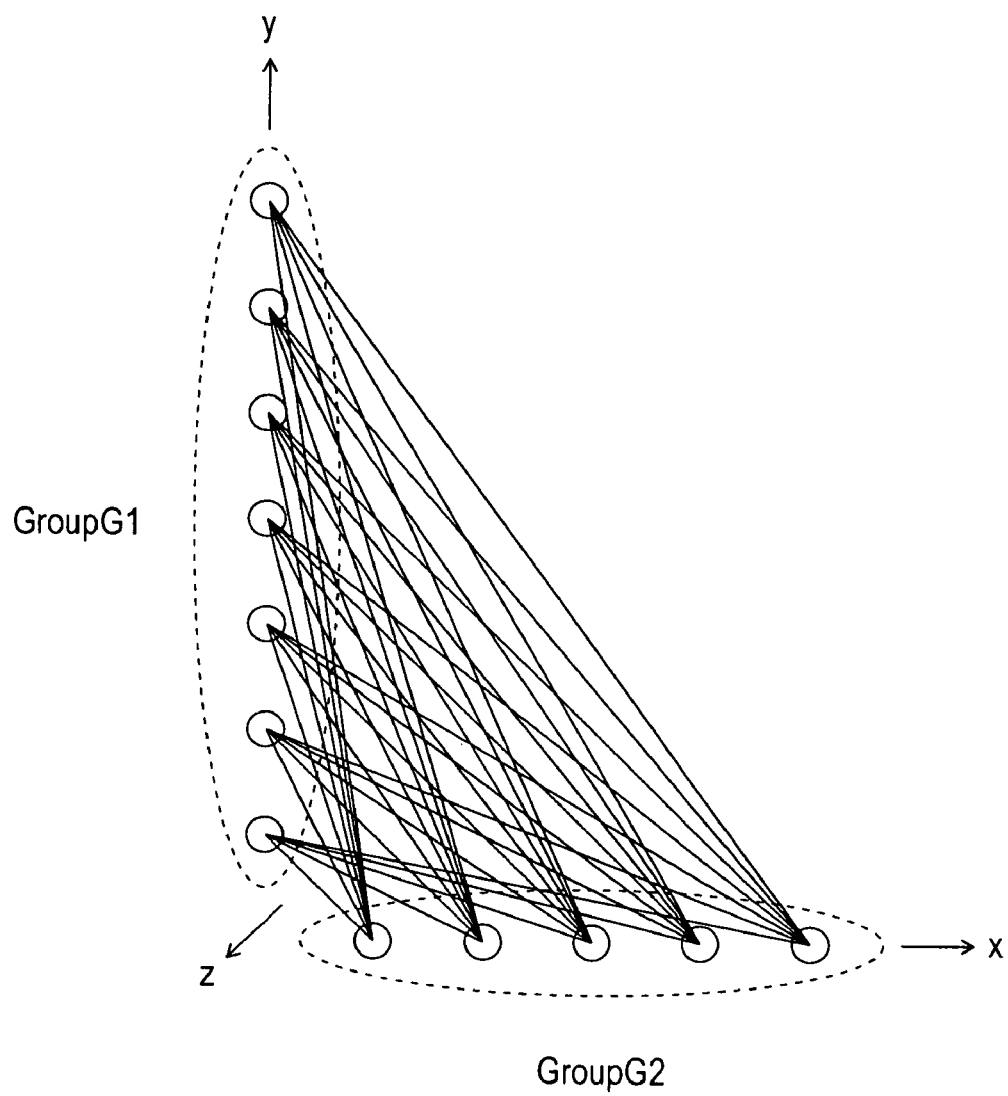

FIG. 8 is a conceptual view showing the three-dimensional interchange structure according to this embodiment. FIG. 9 is a conceptual view of a portion of the three-dimensional interchange structure shown in FIG. 8. As mentioned earlier, the nodes belonging to group G2 are connected to all the nodes among the nodes belonging to group G1 for which the z coordinate values match. In addition, the nodes belonging to group G1 are connected to all the nodes among the nodes belonging to group G2 for which the z coordinate values match. Therefore, the nodes that belong to groups G1 and G2 have a connective relationship of the type shown in FIG. 9. Such a connective relationship is known as a complete bigraph. Obtaining the three-dimensional interchange structure according to this embodiment by expanding the complete bigraph shown in FIG. 9 in three dimensions can also be considered.

(1-3) Four-Dimensional Interchange Structure

Thereafter, the interchange structure according to a data communication network of this embodiment will be described next by taking a four-dimensional case by way of example.

When a four-dimensional link structure is constructed, the nodes are divided up into four groups G1, G2, G3, and G4.

In this description, each node is expressed by means of a coordinate (x, y, z, w). Any one of x, y, z, and w is zero while the others are natural numbers. The coordinates of the nodes belonging to group G1 are expressed as (0, y, z, w). The coordinates of the nodes belonging to group G2 are expressed as (x, 0, z, w). The coordinates of the nodes belonging to group G3 are expressed as (x, y, 0, w). The coordinates of the nodes belonging to group G4 are expressed as (x, y, z, 0).

Figure 10:
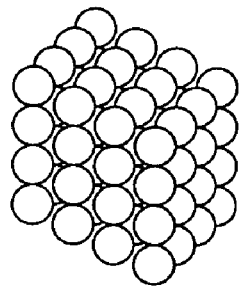
FIGS. 10 to 13 are conceptual views serving to illustrate a four-dimensional interchange structure according to the embodiment of the present invention.
Figure 10:
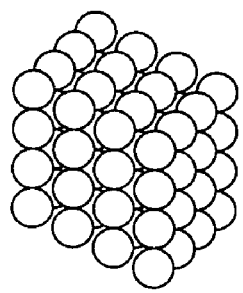
Figure 10:
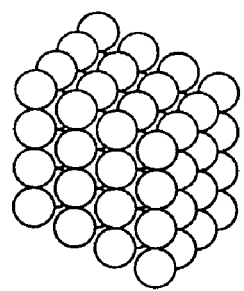
Figure 10:
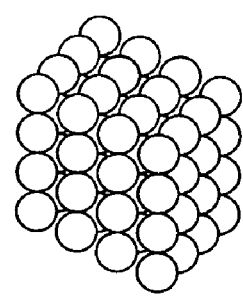
Figure 11:
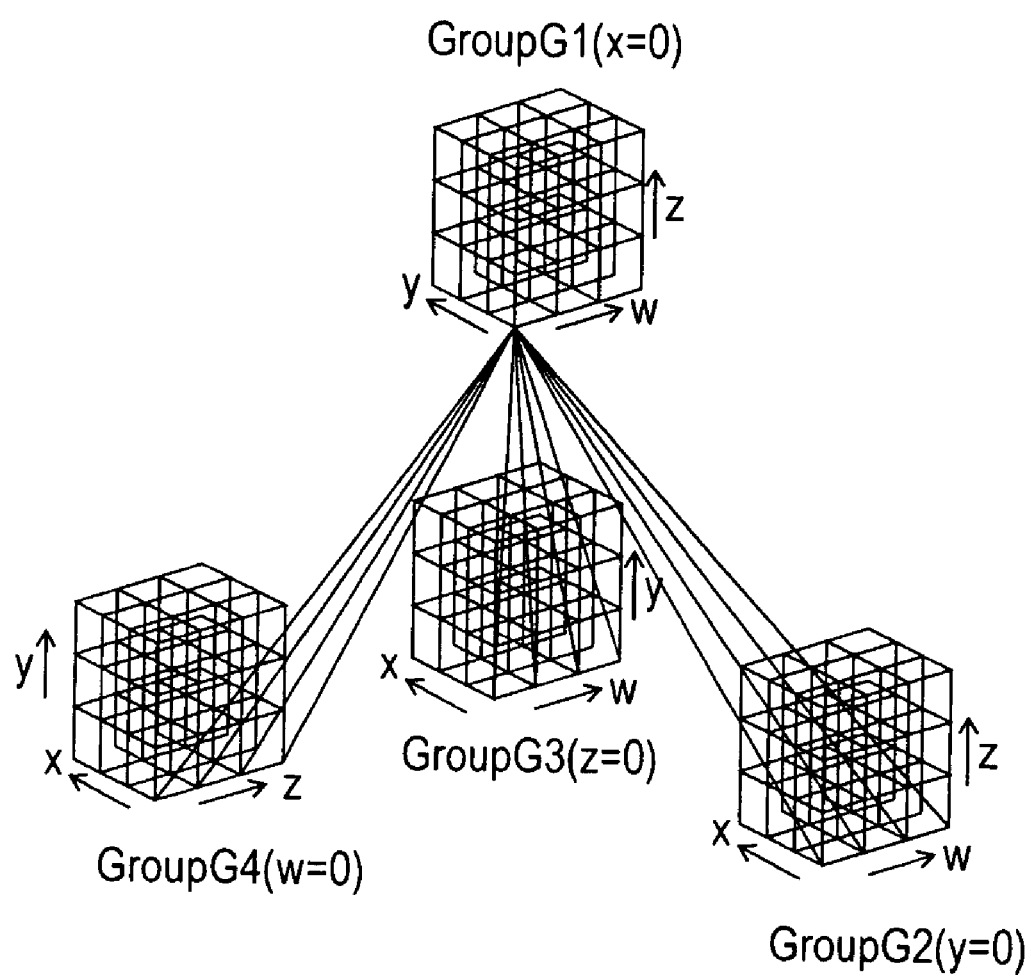

FIG. 10 is a conceptual view of the coordinates of the nodes that belong to groups G1, G2, G3, and G4. In FIG. 10, each node is expressed as a sphere. FIG. 11 is a conceptual view of the coordinate structure of the four-dimensional interchange structure according to this embodiment. In FIG. 11, each node is expressed as a lattice point. FIGS. 10 and 11 do not show the actual positional relationships of each node. Coordinates (x, y, z, w) can be suitably assigned by the designer or the like of the data communication network. In the examples of FIGS. 10 and 11, sixty-four nodes belong to each of groups G1 to G4 and, therefore, the number of nodes in the whole network is 256. However, the number of nodes belonging to each group is not limited. The numbers of nodes belonging to the respective groups need not be the same. As can be seen from FIG. 11, the nodes belonging to group G1 all have an x coordinate value of zero and are therefore specified by the y coordinate value, z coordinate value, and w coordinate value. Likewise, the nodes belonging to group G2 are specified by the x coordinate value, z coordinate value and w coordinate value; the nodes belonging to group G3 are specified by the x coordinate value, y coordinate value, and w coordinate value; and the nodes belonging to group G4 are specified by the x coordinate value, y coordinate value, and z coordinate value.

The respective nodes are not directly connected to other the nodes belonging to the same group but rather are connected to nodes among the nodes belonging to the other groups that satisfy predetermined conditions.

The connection destinations of the nodes belonging to group G1 will now be described. In the following description, one specified node N1 (0, b, c, d) among the nodes that belong to group G1 will be described by way of example. b, c, and d are non-zero values.

The nodes that belong to group G1 are not connected to the other nodes belonging to group G1. Node N1 is connected to the nodes among the nodes belonging to group G2, G3, or G4 which satisfy the following conditions.

Among the nodes that belong to group G2, that is, for which the coordinate value y=0, the nodes which are connected to specified node N1 are nodes whose coordinates satisfy the following conditions:

x=1, 2, 3, . . .
By definition, y=0
z=c
w=d

In other words, among the nodes that belong to group G2, the nodes for which the coordinate values z and w match those of specified node N1 are all connected to node N1.

Among the nodes belonging to group G3, that is, for which z=0, the nodes connected to specified node N1 are nodes whose coordinates satisfy the following conditions:

x=1, 2, 3, . . .
y=b
By definition, z=0
w=d

In other words, the nodes among the nodes belonging to group G3 for which the coordinate values y and w match those of specified node N1 are all connected to specified node N1.

Among the nodes belonging to group G4, that is, for which w=0, the nodes connected to specified node N1 are nodes whose coordinates satisfy the following conditions:

x=1, 2, 3, . . .
By definition, w=0

In other words, among the nodes that belong to group G4, the nodes for which the coordinate values y and z match those of specified node N1 are all connected to specified node N1.

The connection destinations of the other nodes belonging to group G1 are determined by means of the same method as that for specified node N1. As a result, the respective nodes belonging to group G1 are connected to all nodes for which any one of the coordinate values y, z, and w is zero and the other two coordinate values match its own values.

The method of determining the connection destinations of the nodes belonging to the other groups G2 to G4 is also the same as the method of determining the connection destinations of group G1 and therefore a description of this method will not be provided.

Figure 12:
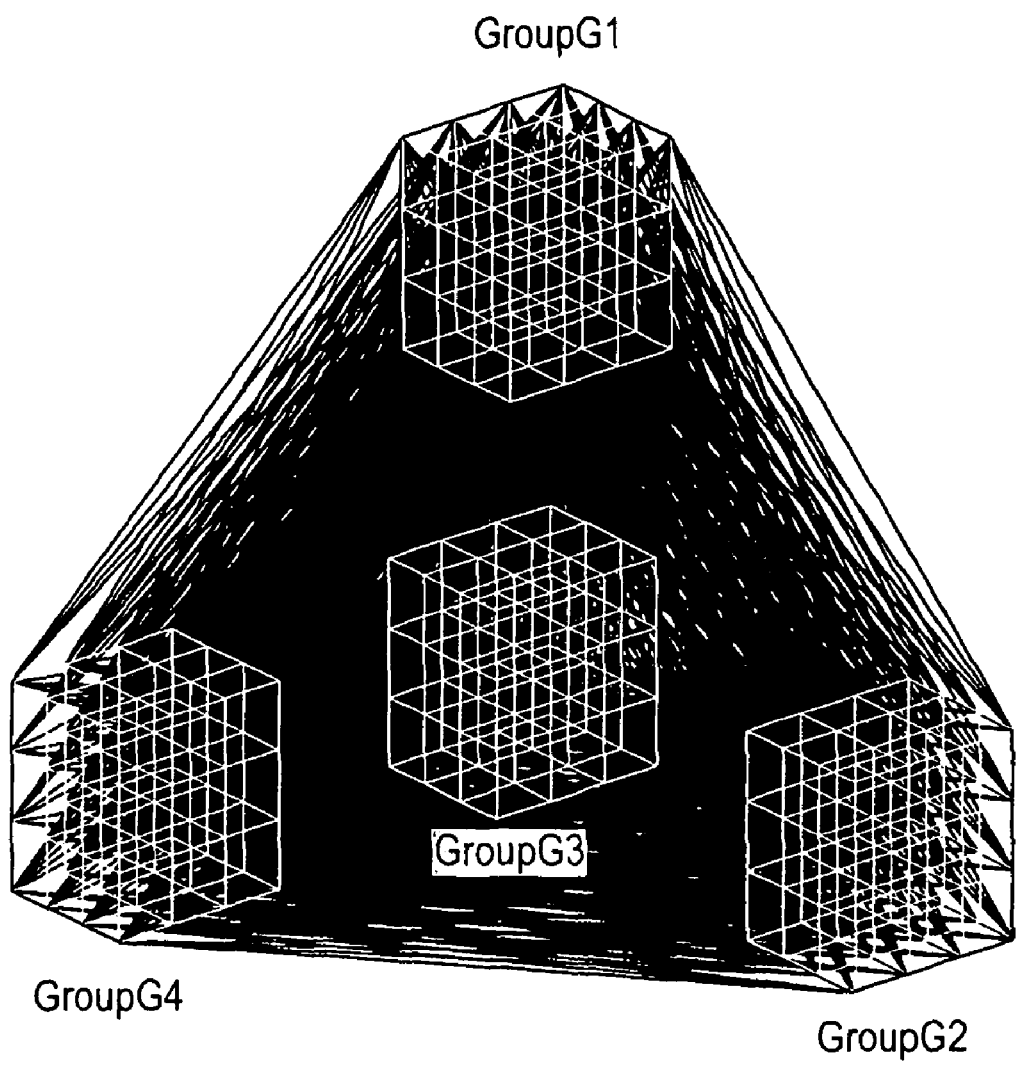
Figure 13:
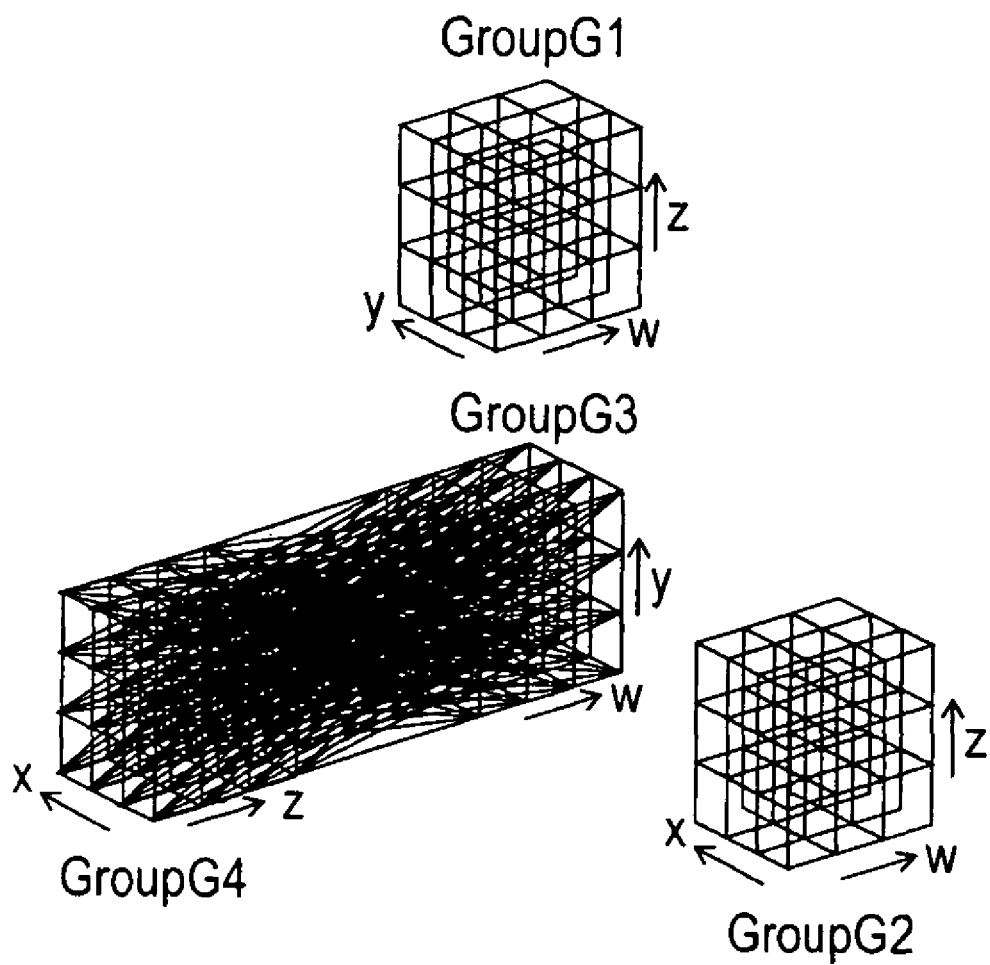

FIG. 12 is a conceptual view of the four-dimensional interchange structure according to this embodiment. FIG. 13 is a conceptual view showing part of the four-dimensional interchange structure shown in FIG. 12. The nodes belonging to group G3 are connected to all the nodes among the nodes belonging to group G4 for which the coordinate values x and y match. In addition, the nodes belonging to group G4 are connected to all the nodes among the nodes belonging to group G3 for which the coordinate values x and y match.

(1-4) m-Dimensional Interchange Structure

The m-dimensional interchange structure according to this embodiment will now be described.

When an m-dimensional interchange structure is constructed, the nodes are divided into m groups G1, G2, G3, . . . , Gm−1, Gm.

In this description, each node is expressed using the coordinates (J1, J2, J3, J4, J5, . . . , Jm−1, Jm). Any one of J1 to Jm is zero while the others are natural numbers. The coordinates of the nodes belonging to group G1 are expressed as (0, J2, J3, J4, J5, . . . , Jm−1, Jm). The coordinates of the nodes belonging to group G2 are expressed as (J1, 0, J3, J4, J5, . . . , Jm−1, Jm). The coordinates of the nodes belonging to the other groups are also first determined in the same way as for group G2. The coordinates of the nodes belonging to the last group Gm are expressed as (J1, J2, J3, J4, J5, . . . , Jm−1, 0).

The respective nodes are not directly connected to other nodes belonging to the same group but rather are connected to nodes among the nodes belonging to the other groups that satisfy predetermined conditions.

The connection destinations of the nodes belonging to group G1 will now be described. In the following description, one specified node N1 (0, j2, j3, j4, j5, . . . , jm−1, jm) among the nodes that belong to group G1 will be described by way of example. j2 to jm are non-zero values.

As mentioned earlier, the nodes belonging to group G1 are not connected to other nodes that belong to group G1. These nodes N are connected to nodes that satisfy the following conditions among the nodes belonging to groups G2 to Gm.

The nodes that are connected to the specified node N1 among the nodes that belong to group G2, that is, for which J2=0 are nodes whose coordinates satisfy the following conditions:

J1=1, 2, 3, . . .
By definition, J2=0
J3=j3
J4=j4
.
.
.
Jm=jm

In other words, nodes for which the coordinate values J3 to Jm all match those of the specified node N1 among the nodes that belong to group G2 are all connected to specified node N1.

Among the nodes belonging to group G3, that is, for which J3=0, the nodes connected to specified node N1 are nodes whose coordinates satisfy the following conditions:

J1=1, 2, 3, . . .
J2=j2
By definition, J3=0
J4=j4
. . .
Jm=jm

In other words, among the nodes belonging to group G3, the nodes for which all the coordinate values J2 and J4 to Jm match those of specified node N1 are all connected to node N1.

So too for groups G3 to Gm, the nodes connected to specified node N1 are determined in the same way as for groups G1 and G2. The conditions whereby the nodes belonging to group Gm are connected to specified node N1 are shown hereinbelow:

J1=1, 2, 3, . . .
J2=j2
J3=j3
J4=j4
.
.
Jm−1=jm−1
By definition, Jm=0

The connection destinations of other nodes belonging to group G1 are determined by means of the same method as that used for the case of specified node N1. As a result, the respective nodes belonging to group G1 are connected to all the nodes for which any one of J2 to Jm is zero and the other coordinates among J2 to Jm all match their own coordinates.

The connection destinations of the nodes belonging to group G2 will be described next. The following description will be provided by taking one specified node N2 (j1, 0, j3, j4, j5, . . . , jm−1, jm) among the nodes belonging to group G2 by way of example. j1 and j3 to jm are non-zero values.

As mentioned earlier, the nodes belonging to group G2 are not connected to other nodes belonging to group G2. These nodes N are connected to nodes among the nodes belonging to groups G1 or G3 to Gm that satisfy the following conditions.

Among the nodes belonging to group G1, that is, for which J1=0, the nodes connected to specified node N2 are nodes whose coordinates satisfy the following conditions:

By definition, J1=0 . . .
J2=1, 2, 3,
J3=j3
J4=j4
.
.
.
Jm=jm

In other words, among the nodes belonging to group G1, the nodes for which the coordinate values J3 to Jm all match those of the specified node N2 are all connected to node N2.

Among the nodes belonging to group G3, that is, nodes for which J3=0, the nodes connected to specified node N2 are nodes whose coordinates satisfy the following conditions:

J1=j1
J2=1, 2, 3, . . .
By definition, J3=0
J4=j4
.
.
.
Jm=jm

In other words, among the nodes which belong to group G3, the nodes for which the coordinate values J1 and J4 to Jm all match those of specified node N2 are all connected to node N2.

So too for groups G4 to Gm, the nodes connected to specified node N2 are determined in the same way as for groups G1 and G3. The conditions whereby the nodes belonging to group Gm are connected to specified node N2 are shown hereinbelow:

J1=j1
J2=1, 2, 3, . . .
J3=j3
J4=j4
.
.
Jm−1=jm−1
By definition, Jm=0

The connection destinations of other nodes belonging to group G2 are determined by means of the same method as that used for the case of specified node N2. As a result, the respective nodes belonging to group G2 are connected to all the nodes for which any one of J1 and J3 to Jm is zero and the other coordinates among J1, J3 to Jm all match their own coordinates.

The method for determining the connection destination of the nodes belonging to groups G3 to Gm is also the same as the methods for determining the connection destination of the node belonging to groups G1 and G2 and therefore a description is not included.

[2] Internal Structure of Node

Figure 14:
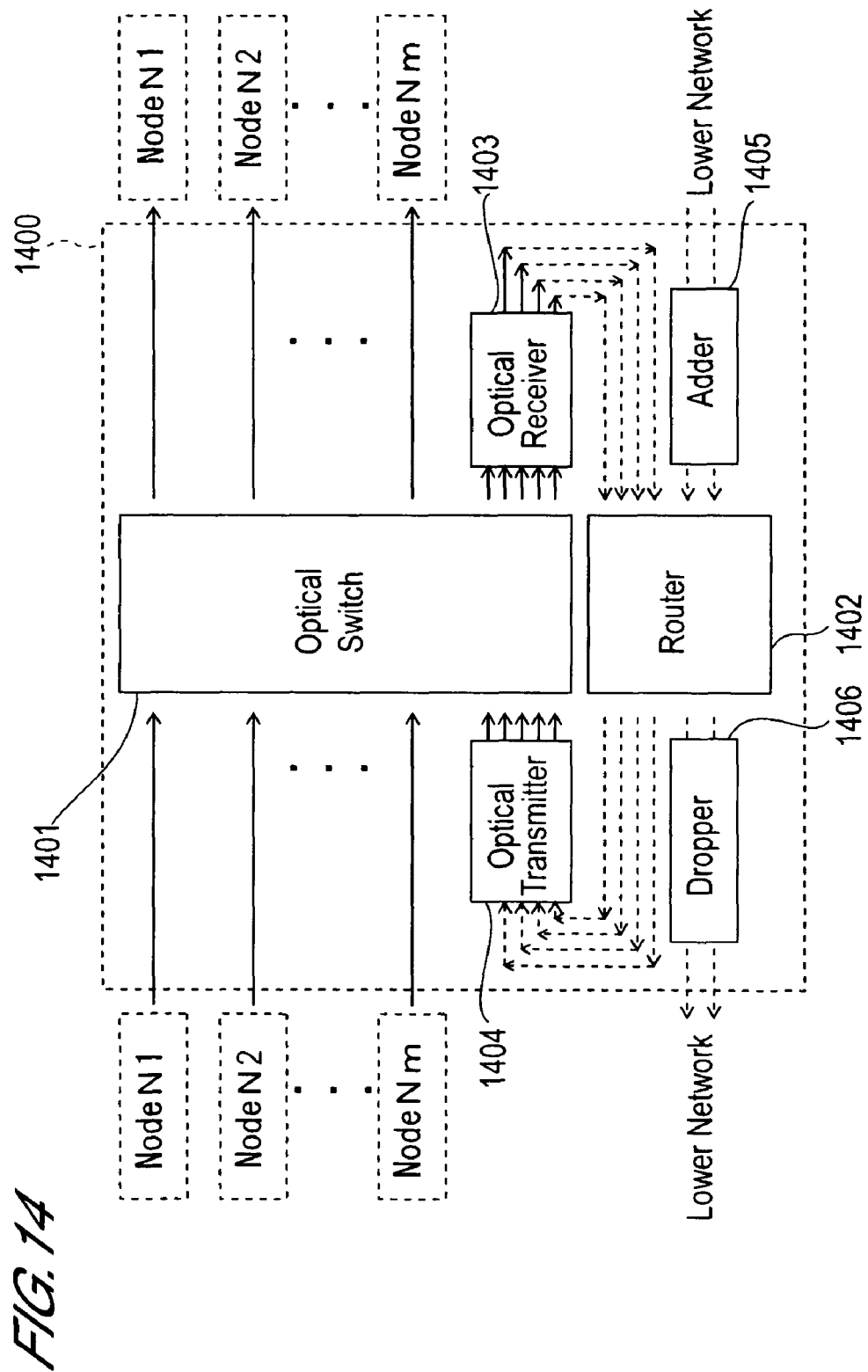
FIG. 14 is a block diagram that schematically shows the internal structure of the optical cross-connect node according to an embodiment of the present invention.

An example of the internal structure of the node relating to the data communication network of this embodiment will now be described using FIG. 14. A node that adopts an optical cross-connect, that is, an OXC, can be used as the node of this embodiment.

The OXC node 1400 of this embodiment is connected to the other nodes N1 to Nm and connected to a lower network that uses electrical cable. As shown in FIG. 14, the OXC node 1400 of this embodiment comprises an optical switch 1401, a router 1402, an optical receiver 1403, an optical transmitter 1404, an adder 1405, and a dropper 1406.

The optical switch 1401 is connected to the other nodes N1 to Nm, the optical receiver 1403, and the optical transmitter 1404. The optical switch 1401 receives a communication packet from the nodes N1 to Nm or optical transmitter 1401. In the case where the transfer destination is any of nodes N1 to Nm, the optical switch 1401 transmits a communication packet to the relevant node. In the case where the transfer destination is the lower network, the optical switch 1401 transmits a communication packet to the optical receiver 1403. The transfer destination of the communication packet is judged by using the destination address contained in the header of the communication packet.

The router 1402 is connected to the optical receiver 1403, the optical transmitter 1404, the adder 1405, and dropper 1406. The router 1402 receives a communication packet from the optical receiver 1403 and adder 1405. When the transfer destination is any of nodes N1 to Nm, the router 1402 transmits a communication packet to the optical transmitter 1404. When the transfer destination is the lower network, the router 1402 transmits a communication packet to the dropper 1406. The transfer destination of the communication packet is judged by using the destination address contained in the header of the communication packet.

The optical receiver 1403 receives a communication packet from the optical switch 1401 and performs Optical/Electrical conversion on the communication packet before sending the converted communication packet to the router 1402.

The optical transmitter 1404 receives a communication packet from the router 1402 and performs Electrical/Optical conversion on the communication packet before sending the converted communication packet to the optical switch 1401.

The adder 1405 sends the communication packet received from the lower network to the router 1402.

dropper 1406 sends the communication packet received from the router 1402 to the lower network.

The data communication network of this embodiment can be applied to a network that performs an exchange by means of only nodes other than the optical cross-connect nodes, for example, a network that performs an exchange by means of only optical switches.

[3] Changing of Link Structure

The method for changing the link structure according to the data communication network of this embodiment will be described by using FIGS. 15A to 15E.

Figure 15A:
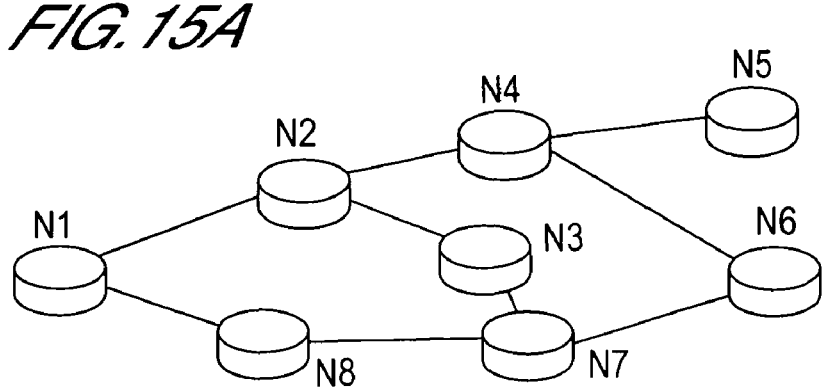
FIGS. 15A to 15E are conceptual views serving to illustrate the link structure change method of the data communication network of the embodiment of the present invention.

FIG. 15A schematically shows an example of optical fiber wiring according to the data communication network. In the example in FIG. 15A, the nodes N1 and N2, nodes N1 and N8, nodes N2 and N3, nodes N2 and N4, nodes N3 and N7, nodes N4 and N5, nodes N4 and N6, nodes N6 and N7, and nodes N7 and N8 are connected using optical fiber.

Figure 15B:
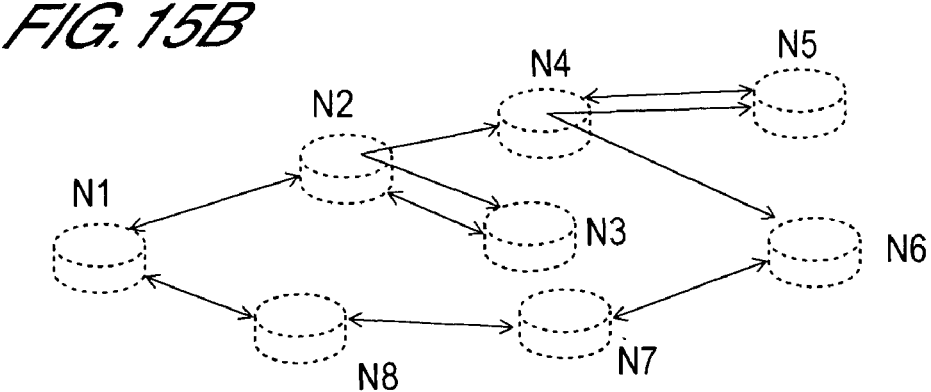
Figure 15C:
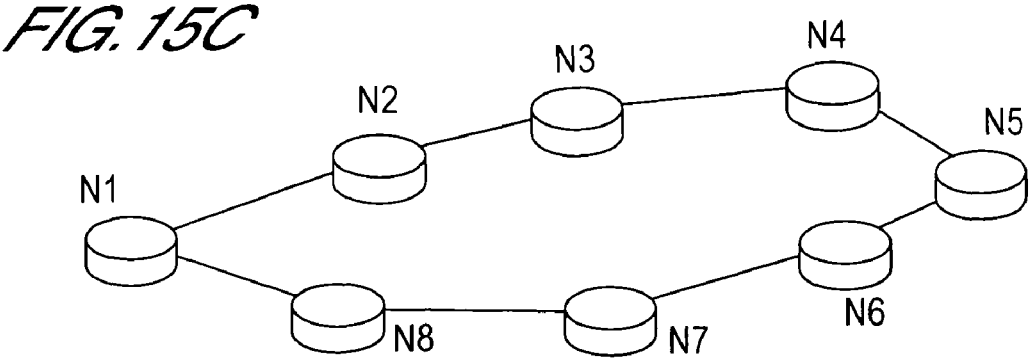

FIG. 15B shows an example of a case where a logical link to the network of FIG. 15A is established. In the example of FIG. 15B, links connecting nodes N1 and N2, nodes N2 and N3, nodes N3 and N4, nodes N4 and N5, nodes N5 and N6, nodes N6 and N7, nodes N7 and N8, and nodes N8 and N1 are established. As a result, the link structure of the data communication network is in the state shown in FIG. 15C.

Figure 15D:
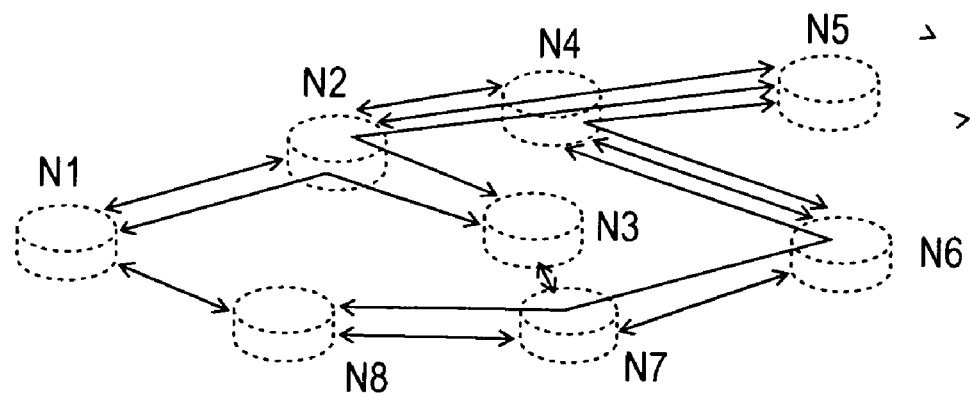
Figure 15E:
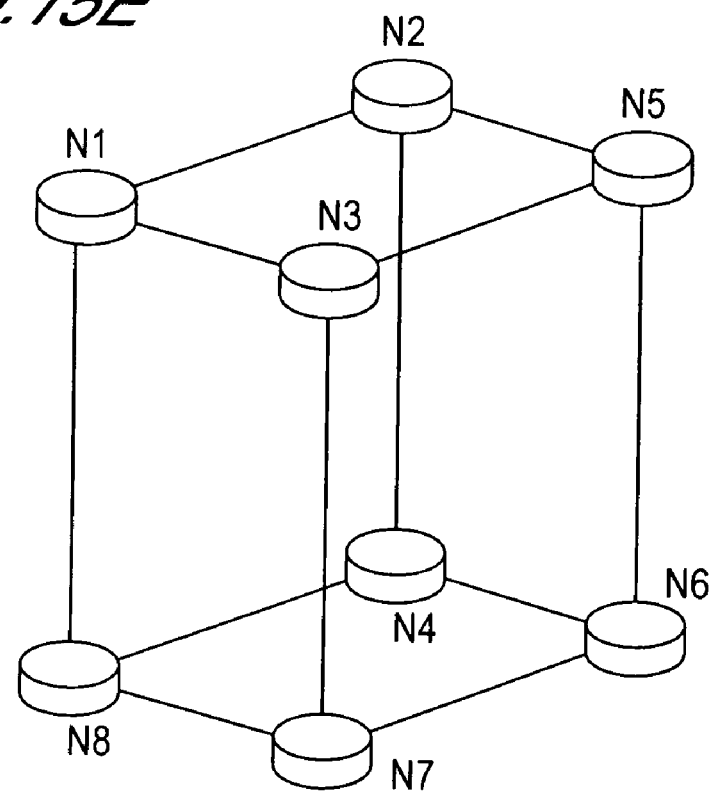

FIG. 15D shows another example of a case where a logical link to the network in FIG. 15A is established. In the example of FIG. 15D, links connecting nodes N1 and N2, nodes N1 and N3, nodes N1 and N8, nodes N2 and N4, nodes N2 and N5, nodes N3 and N5, nodes N3 and N7, nodes N4 and N6, nodes N4 and N8, nodes N5 and N6, nodes N6 and N7, and nodes N7 and N8 are established. As a result, the link structure of the data communication network is a three-dimensional hyper full mesh structure of the type shown in FIG. 15E.

Thus, an optional link structure can be obtained by establishing a logical link between the nodes by using optical fiber. Here, an example of a link structure and three-dimensional hyper full mesh structure is shown and, similarly, the m-dimensional interchange structure of this embodiment can be constructed in the same way.

When a network is actually constructed, the link structure is changed while increasing network resources such as nodes and links in accordance with an increase of the traffic of the network. For example, when the traffic is very small, a one-dimensional full mesh structure can be adopted and, when the traffic increases, the link structure can be changed to a two-dimensional hyper full mesh structure. When the traffic increases further, the link structure is desirably changed to the three-dimensional interchange structure of this embodiment. In addition, when the traffic-handling performance of the three-dimensional interchange structure is inadequate, the link structure is desirably changed to an interchange structure of four or more dimensions.

[4] Costs for Constructing an m-Dimensional Interchange Network

The costs of constructing a network will now be described by taking the example of the construction costs of the internet network. The construction costs of the internet network can be computed by using the Superlinear-Linear Cost Model, for example.

The total network cost (TNC) can be broadly classified as node-related costs and link-related costs. The node-related costs consist of a component $Cost^N$ that depends on the data processing amount of the nodes and a component $C_N$ that is determined by only the number of nodes laid. Likewise, the link-related costs consist of a component $Cost^L$ that depends on data transmission amounts of the links and a component $C_L$ that is determined by only the number of links laid. Therefore, the TNC can be expressed by Equation (1) below. In Equation (1), $^\alpha N$ and $^\beta N$ are proportionality constants, variable $^\alpha T$ is the node data processing performance, and variable $^\beta T$ is link data transmission performance.

$$TNC = \Sigma^\alpha N[Cost^N(^\alpha T) + C_N] + \Sigma^\beta N[Cost^L(^\beta T) + C_L]$$

$Cost^N(x)$ is proportional to $x^k$ ($1.5 \leq k \leq 2.0$). The variable x is processing performance of a node. The reason why $Cost^N(x)$ is proportional to about two times the processing performance is that the number of switch elements installed in a node is in proportion to two times of the processing performance.

$Cost^L(x)$ is proportional to x. The variable x is the data transmission performance of a link. $Cost^L(x)$ is proportional to x because the link data transmission performance is proportional to the number of links.

Generally, the node processing performance and the link transmission performance are set equal. In addition, generally, the costs of the node devices and link device costs are equal. When the data processing performance and device costs in such a case are defined as $T_0$ and $C_0$, the following Equation (2) is established. Equation (3) below can be obtained by using Equations (1) and (2). The A, B, C'$_N$ and C'$_L$ of Equation (3) are defined as following Equations (4).

$$Cost^N(x) = C_0 \left(\frac{x}{T_0}\right)^k \quad Cost^L(x) = C_0 \left(\frac{x}{T_0}\right) \quad (2)$$

$$\frac{TNC}{C_0 X_{eff}} = \frac{A\left(\frac{Y}{T_0}\right)^k + (1-\rho)\left(\frac{Y}{T_0}\right) + \left(C'_N + C'_L \frac{L^N}{2}\right)B}{\rho} \quad (3)$$

$$A = \left(\frac{\alpha'\gamma}{\alpha'\delta}\right)^{K-1} \sum \frac{\alpha \delta^k}{\alpha \gamma^{k-1}} \quad B = \frac{\alpha'\delta}{\alpha'\gamma} \quad C'_N = \frac{C_N}{C_0} \quad C'_L = \frac{C_L}{C_0} \quad (4)$$

The construction costs for a data communication network can be calculated by using Equation (3).

For example, in Japan in 2005, in a real evaluation, an electrical router with a processing performance of 1 Terabit per second is one hundred million Japanese yen, a switch element with a transmission performance of 100 Gigabps is 2,000,000 Japanese yen, a transmission device of 10 Gigabps is 1,000,000 Japanese yen, node laying costs $C_N$ are 5,000,000 Japanese yen, and link laying costs $C_L$ are 25,000,000 Japanese yen. In this case, $C_0=10^8$ Japanese yen, $T_0=2.5\times 10^{13}$ [bps], k=1.7, C'$_N$=5×10$^{-3}$, and C'$_L$=2.5×10$^{-1}$ are expected.

Further, in Japan in 2015, a 10 terabit per second electrical router will come to be sold with a real evaluation for two hundred million Japanese yen and others are expected to be sold at prices on the order of those of 2005. In this case, $C_0=10^9$ Japanese yen, $T_0=2.5\times 10^{13}$ [bps], k=1.7, C'$_N$=5×10$^{-3}$, C'$_L$=2.5×10$^{-1}$.

Figure 3A:
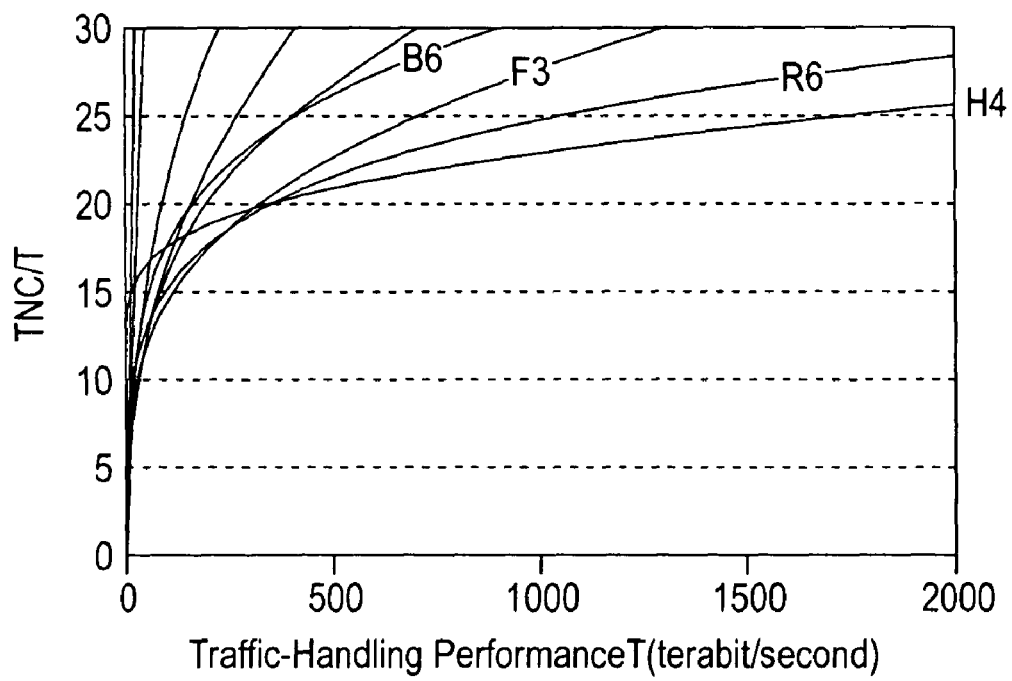
FIG. 3A is a graph that shows the relationship between the traffic-handling performance and the cost performance.
Figure 3B:
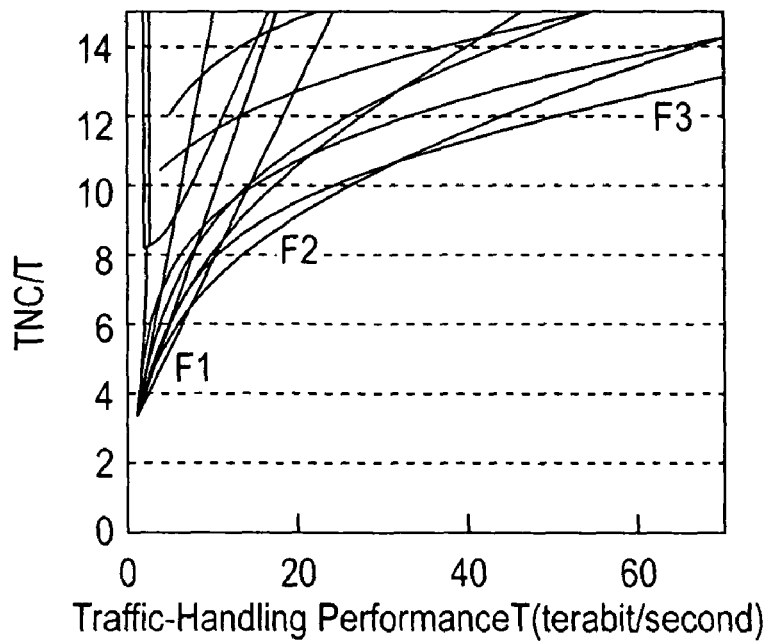
FIG. 3B is a partial enlargement of FIG. 3A.
Figure 16:
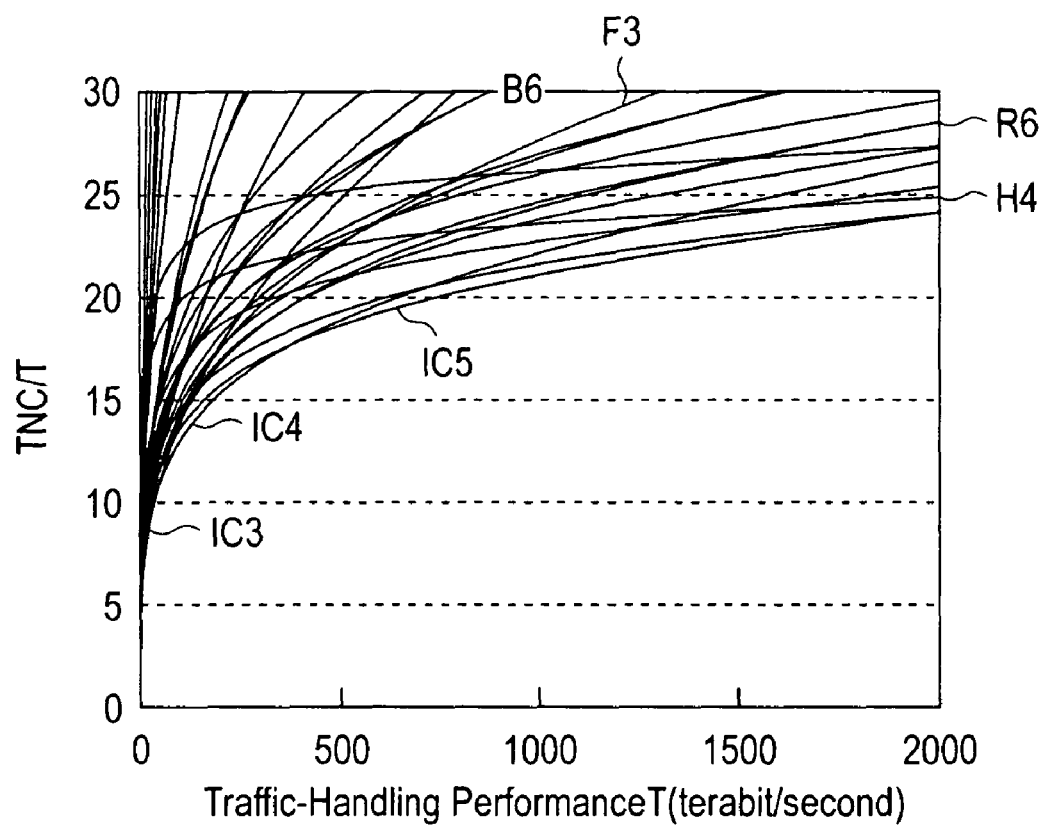
FIG. 16 is a graph that shows the relationship between the traffic-handling performance and the cost performance.

FIG. 16 is a graph showing the relationship between the traffic-handling performance and cost performance. In FIG. 16, the vertical axis represents the cost performance of a network configuration, that is, the ratio TNC/T between the total network cost TNC and traffic-handling performance T. The horizontal axis represents the traffic-handling performance T, the unit of which is terabits/sec. In FIG. 16, the numerals IC3, IC4, and IC5 which are used to label the respective curves represent data communication networks of the interchange structure according to this embodiment. IC3 is a three-dimensional interchange structure, IC4 is a four-dimensional interchange structure, and IC5 is a five-dimensional interchange structure. The other curves are the same as the curves in FIG. 3.

As can be seen from FIG. 16, in comparison with other link structures, the link structure according to this embodiment, that is, the interchange structure, make possible to obtain a high traffic-handling performance T at a small total network cost TNC. When the required traffic-handling performance T is extremely low, the three-dimensional interchange structure IC3 has the optimum cost performance. As the required traffic-handling performance T increases, the four-dimensional interchange structure IC4 has the optimum cost performance. When the required traffic-handling performance T increases further, a five-dimensional interchange structure IC5 has the optimum cost performance.

What is claimed is:

1. A data communication network, comprising:
an m-dimensional (m is a natural number no smaller than 3) interchange structure based on an m-dimensional hyperhub structure in which core nodes contained in the m-dimensional hyperhub structure are directly connected,
wherein the core nodes are divided into m groups, the m-dimensional coordinates (J1, J2, J3, J4, J5, ..., Jm−1, Jm) of the core nodes belonging to a p-th group satisfy the condition that Jp is zero, the m-dimensional coordinates (j1, j2, j3, j4, j5, ..., jm−1, jm) of the core nodes belonging to a q-th group satisfy the condition that jq is zero, and a core node belonging to the p-th group is directly connected to a core node belonging to the q-th group and is not directly connected to other core nodes belonging to the p-th group,
wherein at least one of the core nodes comprises a switch having input ports for receiving data and output ports for sending data.

2. The data communication network according to claim 1, wherein the core node belonging to the p-th group is directly connected to the core nodes belonging to the q-th group, and the m-dimensional coordinates of the two core nodes satisfy the conditions that Jp=0, jq=0 and Jr=jr (r differs from p and q).

3. The data communication network according to claim 1, wherein the core node belonging to the p-th group is directly connected to all the core nodes belonging to the q-th group which satisfy the conditions that Jp=0, jq=0 and Jr=jr (r differs from p and q).

4. The data communication network according to claim 1, wherein the switch is an optical switch.

5. A data communication network, comprising:
an m-dimensional (m is a natural number no smaller than 3) interchange structure based on an m-dimensional hyperhub structure in which core nodes contained in the m-dimensional hyperhub structure are directly connected,
wherein the core nodes are divided into m groups, the m-dimensional coordinates (J1, J2, J3, J4, J5, ..., Jm−1, Jm) of the core nodes belonging to a p-th group satisfy the condition that Jp is zero, the m-dimensional coordinates (j1, j2, j3, j4, j5, ..., jm−1, jm) of the core nodes belonging to a q-th group satisfy the condition that jq is zero, and a core node belonging to the p-th group is directly connected to a core node belonging to the q-th group and is not directly connected to other core nodes belonging to the p-th group,
wherein at least one of the core nodes comprises a router.

6. The data communication network according to claim 5, wherein the core node belonging to the p-th group is directly connected to the core nodes belonging to the q-th group, and the m-dimensional coordinates of the two core nodes satisfy the conditions that Jp=0, jq=0 and Jr=jr (r differs from p and q).

7. The data communication network according to claim 5, wherein the core node belonging to the p-th group is directly connected to all the core nodes belonging to the q-th group which satisfy the conditions that Jp=0, jq=0 and Jr=jr (r differs from p and q).

8. A data communication network, comprising:
an m-dimensional (m is a natural number no smaller than 3) interchange structure based on an m-dimensional hyperhub structure in which core nodes contained in the m-dimensional hyperhub structure are directly connected by means for transferring data,
wherein the core nodes are divided into m groups, the m-dimensional coordinates (J1, J2, J3, J4, J5, ..., Jm−1, Jm) of the core nodes belonging to a p-th group satisfy the condition that Jp is zero, the m-dimensional coordinates (j1, j2, j3, j4, j5, ..., jm−1, jm) of the core nodes belonging to a q-th group satisfy the condition that jq is zero, and a core node belonging to the p-th group is directly connected to a core node belonging to the q-th group and is not directly connected to other core nodes belonging to the p-th group.

9. The data communication network according to claim 8, wherein the core node belonging to the p-th group is directly connected to the core nodes belonging to the q-th group, and the m-dimensional coordinates of the two core nodes satisfy the conditions that Jp=0, jq=0 and Jr=jr (r differs from p and q).

10. The data communication network according to claim 8, wherein the core node belonging to the p-th group is directly connected to all the core nodes belonging to the q-th group which satisfy the conditions that Jp=0, jq=0 and Jr=jr (r differs from p and q).

11. The data communication network of claim 8, wherein the means for transferring data comprises at least one optical fiber.

* * * * *